United States Patent
Dieudonne et al.

(10) Patent No.: US 11,634,988 B2
(45) Date of Patent: Apr. 25, 2023

(54) TURBOMACHINE BLADE HAVING A MAXIMUM THICKNESS LAW WITH HIGH FLUTTER MARGIN

(71) Applicant: SAFRAN AIRCRAFT ENGINES, Paris (FR)

(72) Inventors: Sadim Dieudonne, Moissy-Cramayel (FR); Mickaël Cavarec, Moissy-Cramayel (FR); Guillaume Pascal Jean-Charles Gondre, Moissy-Cramayel (FR); Nicolas Pierre Alain Edme De Cacqueray-Valmenier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/312,757

(22) PCT Filed: Dec. 10, 2019

(86) PCT No.: PCT/FR2019/053006
§ 371 (c)(1),
(2) Date: Jun. 10, 2021

(87) PCT Pub. No.: WO2020/120898
PCT Pub. Date: Jun. 18, 2020

(65) Prior Publication Data
US 2022/0018257 A1 Jan. 20, 2022

(30) Foreign Application Priority Data
Dec. 11, 2018 (FR) ...................... 1872701

(51) Int. Cl.
*F01D 5/14* (2006.01)
(52) U.S. Cl.
CPC .......... *F01D 5/141* (2013.01); *F05D 2220/36* (2013.01); *F05D 2240/301* (2013.01)
(58) Field of Classification Search
CPC ... F01D 5/141; F01D 5/16; F01D 5/34; F01D 9/041; F04D 29/324; F04D 29/384; F04D 29/388; F04D 29/666; F04D 29/325; F05D 2220/36; F05D 2220/32; F05D 2240/30; F05D 2240/301; F05D 2260/961
See application file for complete search history.

(56) References Cited

U.S. PATENT DOCUMENTS 7,497,664 B2 * 3/2009 Walter ................... F01D 5/141
416/DIG. 5
9,347,323 B2 * 5/2016 Gallagher ............. F04D 29/325
(Continued)

*Primary Examiner* — Eric J Zamora Alvarez
(74) *Attorney, Agent, or Firm* — Sughrue Mion, PLLC

(57) ABSTRACT

A turbomachine rotor blade is formed of plural blade sections stacked along an axis extending from a blade root to a blade tip. Each blade section located at various heights along the blade is designed to have a given ratio between a maximum thickness, which is measured between a suction side and pressure side of the blade, and a chord, which is defined by a line connecting a leading edge and a trailing edge of the blade. Each blade section is further designed to have a ratio of the maximum thickness to the chord at a given height of the blade relative to a ratio of the maximum thickness to the chord of another blade section located at a different height of the blade.

9 Claims, 6 Drawing Sheets

(56) References Cited

U.S. PATENT DOCUMENTS

| | | | |
|---|---|---|---|
| 9,845,684 B2* | 12/2017 | Warikoo | F04D 29/324 |
| 2019/0101001 A1* | 4/2019 | Nash | F01D 5/186 |
| 2019/0107123 A1* | 4/2019 | Veitch | F04D 29/666 |

* cited by examiner

TURBOMACHINE BLADE HAVING A MAXIMUM THICKNESS LAW WITH HIGH FLUTTER MARGIN

CROSS REFERENCE TO RELATED APPLICATIONS

This application is a National Stage of International Application No. PCT/FR2019/053006 filed Dec. 10, 2019, claiming priority based on French Patent Application No. 1872701 filed Dec. 11, 2018, the entire contents of each of which being herein incorporated by reference in their entireties.

GENERAL TECHNICAL FIELD AND PRIOR ART

The invention relates to the field of turbomachine blades and more particularly to the field of turbomachine rotor blades.

The invention is intended in particular to be used in fans within a turbojet or a turbomachine.

A turbomachine comprises at least one blading, such as a fan for example, which includes a plurality of blades arranged radially around a central axis, for example around a disk.

A blading of this type forms either a rotor, when it is mobile blading or a bladed disk, or a stator.

The blades can be considered as excrescences with respect to a continuous ring. Two adjacent blades and the ring define an air flow corridor.

The proximal end of each blade with respect to the central axis is usually denominated the blade root. In particular, the blade root is considered here to be the portion of the blade located over the ring.

The distal end is usually denominated the blade tip. The distance between the root and the tip of the blade is known as the blade height.

Between the root and the tip of the blade, the blade can be represented theoretically by a stack of sections or aerodynamic profiles perpendicular to a radial axis Z.

The blade is a complex part to produce because it is involved simultaneously in aerodynamic, mechanical and acoustic aspects of the blading and of the turbomachine.

The design of the blade and of the blading necessitates working simultaneously on aerodynamic performance, mechanical resistance and the reduction of masses, noise and cost.

The design must guarantee a minimum lifetime of the blade and of the disk to which the blades are attached.

The design must guarantee a minimum vibration resistance of the blading, i.e. a sufficient resistance to vibrations, or an acceptable level of vibrations for ensuring mechanical resistance.

The blading must have a resistance to the ingestion of foreign bodies and resistance to blade loss, i.e. resistance of the blading to situations where a blade is partially or entirely detached from the disk.

The flutter phenomenon must be taken into account during the design of the blade and of the blading.

Flutter is an aeromechanical coupling due to the relative movement of the air with respect to the structure of the blades and of the blading. Flutter is a self-maintaining phenomenon, the modification of the solid structure modifying the flow of the fluid and the modification of the flow of the fluid generating forces on the solid structure. Flutter can be amplified rapidly and lead to the rupture of a blade of the fan, or even damage to the engine.

Flutter is strongly linked to the design of the structure, so that it is difficult to eliminate or even to limit a flutter phenomenon once it has been detected in the operation of a fan.

There then remains the possibility of prohibiting certain operating zones to limit risks linked to flutter, but this necessarily reduces the flight conditions in which the fan can operate.

Document FR 2 989 415 A1 proposes an axial turbine blade in which the ratio of the maximum thickness of the blade to its chord in a segment adjacent to a blade root or tip is greater than any ratio of the maximum thickness of the blade to its chord in an intermediate segment not adjacent to the blade root or tip.

Document EP 0 112 003 A1 proposes a blade and fan geometry defined by a chord and thickness law depending on the blade height.

Document EP 1 754 859 A2 proposes a manufacturing method of a blade in which the ratio of the maximum thickness of the blade to its chord at the blade root and at the blade tip is greater than a ratio of the maximum thickness of the blade to its chord in an intermediate segment not adjacent to the blade root or tip.

There exists therefore a need for a blade and a blading for which the operating zone where flutter appears is as distant as possible from the zone of nominal operation, i.e. a blade and a blading which has the largest possible flutter margin.

GENERAL PRESENTATION OF THE INVENTION

A general goal of the invention is to palliate the disadvantages of the blades and of the fans of the prior art.

In particular, one goal of the invention is to propose a solution for increasing the flutter margin.

Still another goal is to propose a solution for increasing the flutter margin and a blade in which the mechanical behavior of the blade or the aerodynamic performance is not degraded.

This goal is achieved within the scope of the present invention by means of a turbomachine rotor blade comprising a plurality of blade sections stacked along an axis Z between a blade root and a blade tip, defining between them the height of the blade, each blade section including a leading edge, a trailing edge, a pressure side and a suction side, a chord defined by the length of the portion of a line connecting the leading edge and the trailing edge in the section and a maximum thickness defined by the maximum distance between the suction side and the pressure side, characterized in that:
  the ratio between the maximum thickness and the chord at 30% of the height of the blade is comprised between 20% and 42% of the ratio between the maximum thickness and the chord at the blade root,
  the ratio between the maximum thickness and the chord at 70% of the height of the blade is comprised between 10% and 30% of the ratio between the maximum thickness and the chord at the blade root,
  the ratio between the maximum thickness and the chord at 90% of the height of the blade is comprised between 10% and 30% of the ratio between the maximum thickness and the chord at the blade root, the ratio between the maximum thickness and the chord at the blade tip is comprised between 3% and 21% of the ratio between the maximum thickness and the chord at the blade root.

A blade of this type is advantageously completed by the following different features, taken alone or in combination:

the ratio between the maximum thickness and the chord of a section of the blade is comprised between:

A first function defined by
- a first piece of a line defined by a ratio between the maximum thickness and the chord at the blade root equal to 12% and a ratio between the maximum thickness and the chord at 30% of the height of the blade equal to 3%,
- a second piece of a line defined by a ratio between the maximum thickness and the chord at 30% of the height of the blade equal to 3% and a ratio between the maximum thickness and the chord at 70% of the height of the blade equal to 1.5%,
- a third piece of a line defined by a ratio between the maximum thickness and the chord at 70% of the height of the blade equal to 1.5% and a ratio between the maximum thickness and the chord at 90% of the height of the blade equal to 1.5%,
- a fourth piece of a line defined by a ratio between the maximum thickness and the chord at 90% of the height of the blade equal to 1.5%, and a ratio between the maximum thickness and the chord at the blade tip equal to 0.5%, and a second function defined by
- a fifth piece of a line defined by a ratio between the maximum thickness and the chord at the blade root equal to 14%, and a ratio between the maximum thickness and the chord at 30% of the height of the blade equal to 5%,
- a sixth piece of a line defined by a ratio between the maximum thickness and the chord at 30% of the height of the blade equal to 5%, and a ratio between the maximum thickness and the chord at 70% of the height of the blade equal to 3.5%,
- a seventh piece of a line defined by a ratio between the maximum thickness and the chord at 70% of the height of the blade equal to 3.5%, and a ratio between the maximum thickness and the chord at 90% of the height of the blade equal to 3.5%, and
- an eighth piece of a line defined by a ratio between the maximum thickness and the chord at 90% of the height of the blade equal to 3.5%, and a ratio between the maximum thickness and the chord at the blade tip equal to 2.5%.

the ratio between the maximum thickness and the chord varies depending on its height according to a piecewise affine function from the root to 30% of the height of the blade, from 30% to 70% of the height of the blade, from 70% to 90% of the height of the blade, and from 90% of the height of the blade to the blade tip.

the ratio between the maximum thickness and the chord of a section of the blade decreases or remains constant as the height of the section increases.

the ratio between the maximum thickness and the chord at 30% of the height of the blade is comprised between 26% and 36%, preferably on the order of 30.8% of the ratio between the maximum thickness and the chord at the blade root.

the ratio between the maximum thickness and the chord at 70% of the height of the blade is comprised between 14% and 24%, preferably on the order of 19.2% of the ratio between the maximum thickness and the chord at the blade root.

the ratio between the maximum thickness and the chord at 90% of the height of the blade is comprised between 14% and 24%, preferably on the order of 19.2% of the ratio between the maximum thickness and the chord at the blade root.

the ratio between the maximum thickness and the chord at the blade tip is comprised between 6.5% and 16.5%, preferably on the order of 11.5% of the ratio between the maximum thickness and the chord at the blade root.

the ratio between the maximum thickness and the chord at the blade root is comprised between 8% and 18%, preferably on the order of 13%.

The invention also relates to a turbomachine fan including a plurality of rotor blades as described above.

The invention also relates to a turbomachine which comprises a fan of this type.

PRESENTATION OF THE FIGURES

Other features and advantages of the invention will also be revealed by the description that follows, which is purely illustrative and not limiting, and must be read with reference to the appended drawings, in which.

DESCRIPTION OF ONE OR MORE MODES OF IMPLEMENTATION AND EMBODIMENTS

Turbomachine—General Presentation

Figure 1:
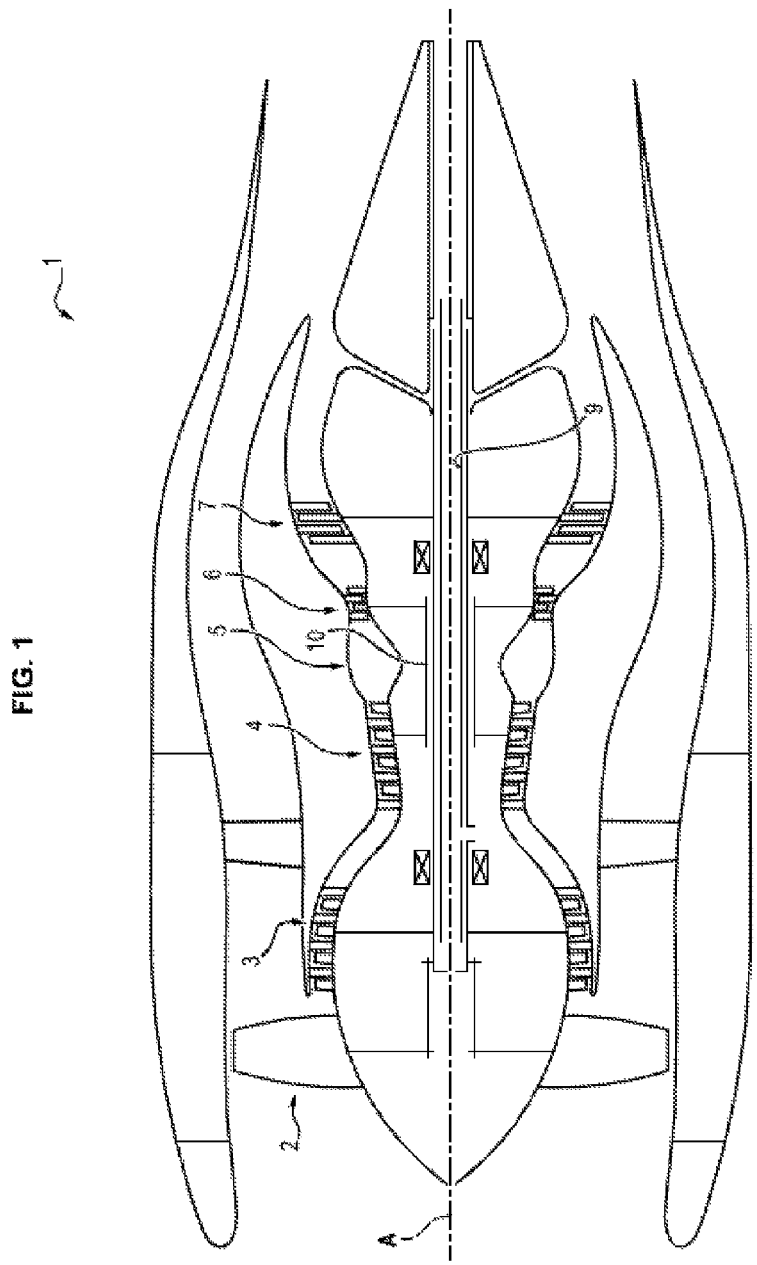
FIG. 1 is a schematic longitudinal section of a turbomachine.

With reference to FIG. 1, a turbomachine is shown schematically, more specifically an axial-flow double flow turbojet 1. The turbojet 1 illustrated includes a fan 2, a low-pressure compressor 3, a high-pressure compressor 4, a combustion chamber 5, a high-pressure turbine 6, and a low-pressure turbine 7.

The fan 2 and the low-pressure compressor 3 are connected to the low-pressure turbine 7 by a first transmission shaft 9, while the high-pressure compressor 4 and the high-pressure turbine 6 are connected by a second transmission shaft 10.

During operation, a flow of air compressed by the low- and high-pressure compressors 3 and 4 feeds combustion in the combustion chamber 5, the expansion of the combustion gases of which drives the high- and low-pressure turbines 6, 7. By means of the shafts 9 and 10, the turbines 6, 7 thus drive the fan 2 and the compressors 3, 4. The air propelled by the fan 2 and the combustion gases leaving the turbojet 1 through a propulsive nozzle (not illustrated) downstream of the turbines 6, 7 exert a reaction thrust on the turbojet 1 and, through it, on a vehicle or machine such as an airplane (not illustrated).

Each compressor 3, 4 and each turbine 6, 7 of the turbojet 1 includes several stages, each stage being formed by a fixed blading or stator, and a rotating blading or rotor.

Figure 2:
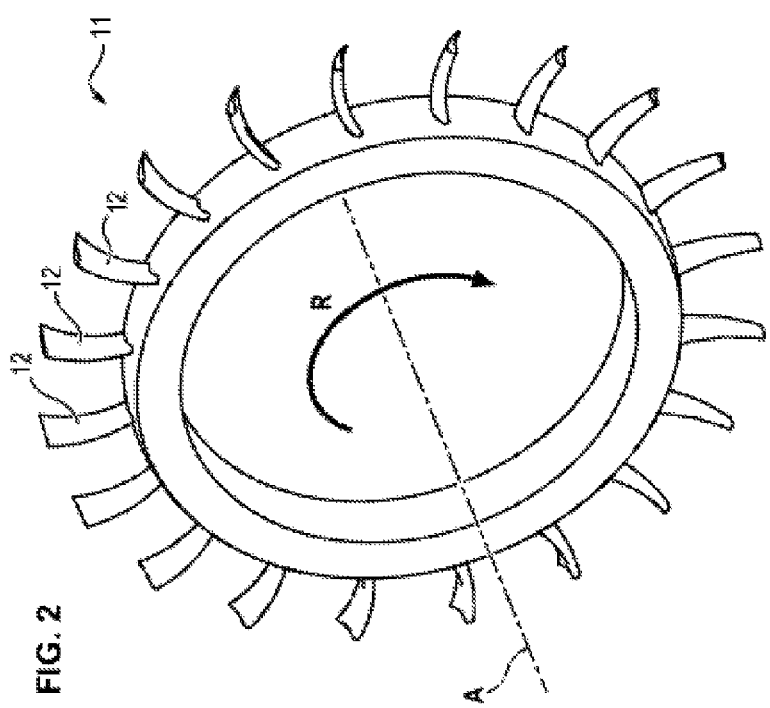
FIG. 2 is a perspective schematic view of a turbomachine fan rotor.

With reference to FIG. 2, a turbomachine fan rotor 11 is illustrated schematically. This rotor 11, includes a plurality of blades 12 arranged radially around the axis of rotation A of the rotor 11, which is substantially parallel to the general flow direction of the working fluid through the turbojet 1.

The blades 12 can consist of parts distinct from the rest of the rotor and be applied to it by attachment means generally known in the prior art, such as pinned fasteners or Christmas tree attachments.

Figure 3:
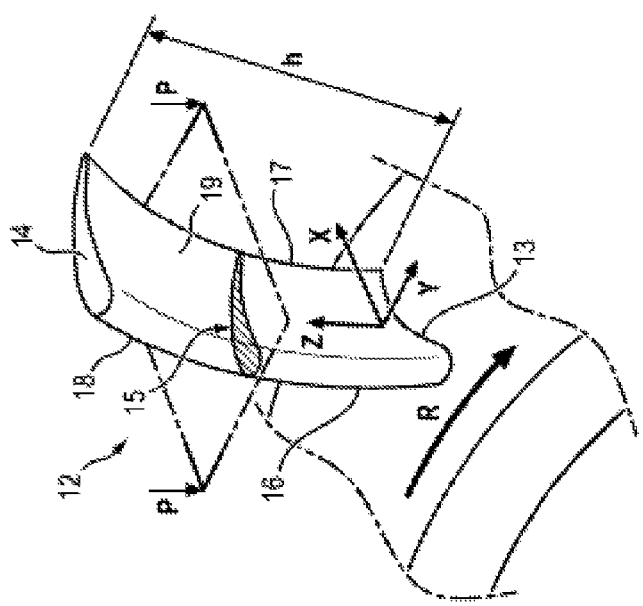
FIG. 3 is a perspective schematic view of a detail of the rotor of FIG. 2.

With reference to FIG. 3, a schematic perspective view of one detail of the rotor of FIG. 2 is offered. Each blade 12 has a spatial reference system with three orthogonal axes X, Y and Z.

The X axis is parallel to the axis of rotation A of the rotor 11, the axis Y is tangent to the direction of rotation R of the blade 12 around the axis of rotation A, and the axis Z is a radial axis in a direction transverse to the axis of rotation A.

Each blade 12 includes a blade root 13 and a blade tip 14 separated by a blade height h in the direction of the radial axis Z.

Between the blade root 13 and the blade tip 14, the blade 12 can be represented theoretically by a stack of sections or aerodynamic profiles 15 in planes perpendicular to the radial axis Z.

Figure 4:
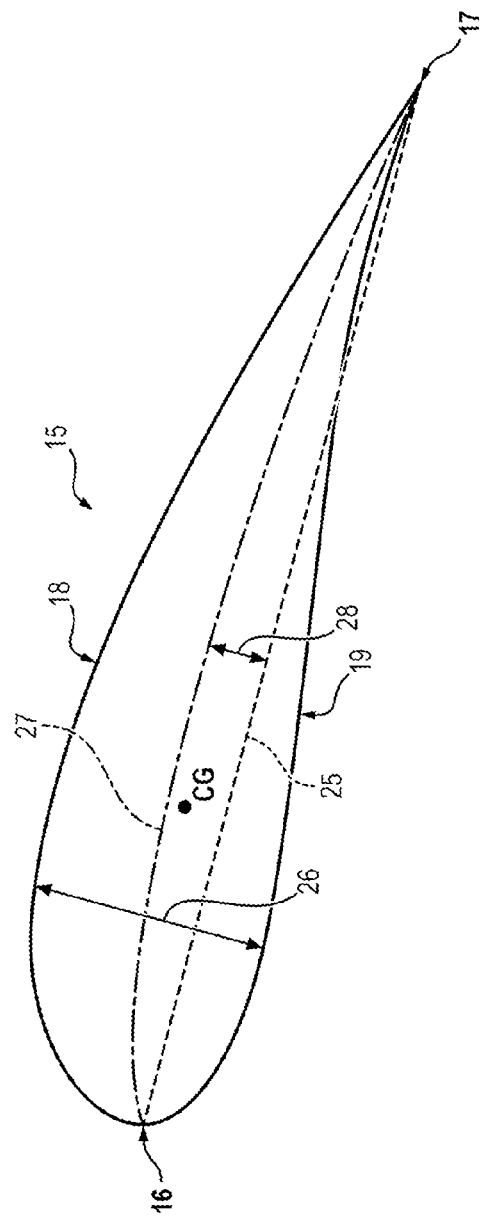
FIG. 4 shows schematically a section of a blade.

The turbomachine rotor blade can be described as including a plurality of blade sections stacked along an axis Z between the blade root and the blade tip, defining between them the height of the blade h. A plane P of this type is shown in FIGS. 3 and 4.

The blade 12 includes a leading edge 16 in the upstream direction, a trailing edge 17 in the downstream direction, a suction side 18 and a pressure side 19.

Each blade section can be described as including a leading edge and a trailing edge.

In a compressor or fan rotor, the direction of rotation R in normal operation is such that each blade 12 moves in the direction of its pressure side 19.

A blade section 15 is shown schematically in FIG. 4 with a chord line 25 and a camber line 27.

The chord line 25 is a line segment, connecting the leading edge 16 and the trailing edge 17 in this section 15. In the present text, the term "chord" alone is used to designate the greatest distance between these two most distant points.

The camber line 27 is a curve equal to the average of the suction side curve 18 and the pressure side curve 19 in said section 15. More precisely, the camber line is formed of all the points situated at equal distance from the suction side 18 and the pressure side 19. The distance of a particular point of the suction side (or of the pressure side) is defined here as the minimum distance between the particular point and a point of the suction side (or of the pressure side).

Also shown by double arrows in this FIG. 4 are:
the maximum thickness 26 of the section (maximum distance between the section side 18 and the pressure side 19) in a direction perpendicular to the chord line,
the maximum distance or maximum camber 28 between the chord 25 and the camber line 27; the maximum camber corresponds to the maximum length of a segment perpendicular to the chord line and connecting a point of the chord line and a point of the camber line;
the center of gravity CG of the blade section, which is the barycenter of the masses of the blade section. The position of the center of gravity is defined in the plane of the section with respect to the axis Z, i.e. by coordinates along the axes X and Y in said section.

Maximum Thickness Laws

A maximum thickness over chord law or maximum thickness law is defined here as one or more conditions dealing with the value of the ratio between the maximum thickness and the chord of a blade section depending on the height of the blade section. The maximum thicknesses of the blades vary depending on the height of the section which corresponds to them within the height of the blade. The height of the section is expressed as a percentage between 0%, corresponding to a reference at the blade root, and 100% corresponding to the blade tip. The expression "at 30% of the height of the blade" designates, in this document, a blade section located at a height of 30%.

It has been noted by the inventors that the maximum thickness laws allow much better flutter margins.

This is the case particularly when the following relations are satisfied:
the ratio between the maximum thickness and the chord at 30% of the height of the blade is comprised between 20% and 42% of the ratio between the maximum thickness and the chord at the blade root,
the ratio between the maximum thickness and the chord at 70% of the height of the blade is comprised between 10% and 30% of the ratio between the maximum thickness and the chord at the blade root,
the ratio between the maximum thickness and the chord at 90% of the height of the blade is comprised between 10% and 30% of the ratio between the maximum thickness and the chord at the blade root,
the ratio between the maximum thickness and the chord at the blade tip is comprised between 3% and 21% of the ratio between the maximum thickness and the chord at the blade root.

Still better margins are obtained if the ratio between the maximum thickness and the chord at 30% of the height of the blade is comprised between 26% and 36% of the ratio between the maximum thickness and the chord at the blade root, and preferably amounts to the order of 30.8%.

It is specified that, in this document, a ratio Ra (which is expressed in percentages) is considered to be on the order of a certain percentage Pa if the ratio Ra verifies $-1\% \leq (Ra-Pa) \leq +1\%$. For example, Ra is on the order of 10% if Ra is comprised between 9% and 11%.

Likewise, the ratio between the maximum thickness and the chord at 70% of the height of the blade can be comprised between 14% and 24% of the ratio between the maximum thickness and the chord at the blade root, and preferably amounts to the order of 19%.

The ratio between the maximum thickness and the chord at 90% of the height of the blade can be comprised between 14% and 24% of the ratio between the maximum thickness and the chord at the blade root, and preferably amounts to the order of 19%.

The ratio between the maximum thickness and the chord at the blade tip can be comprised between 9% and 14% of the ratio between the maximum thickness and the chord at the blade root, and preferably amounts to the order of 11.5%.

The ratio between the maximum thickness and the chord is defined with the values:
r for a height percentage of 0%,
s for a height percentage of 30%,
t for a height percentage of 70%,
u for a height percentage of 90%, and
v for a height percentage of 100%.

Figure 5:
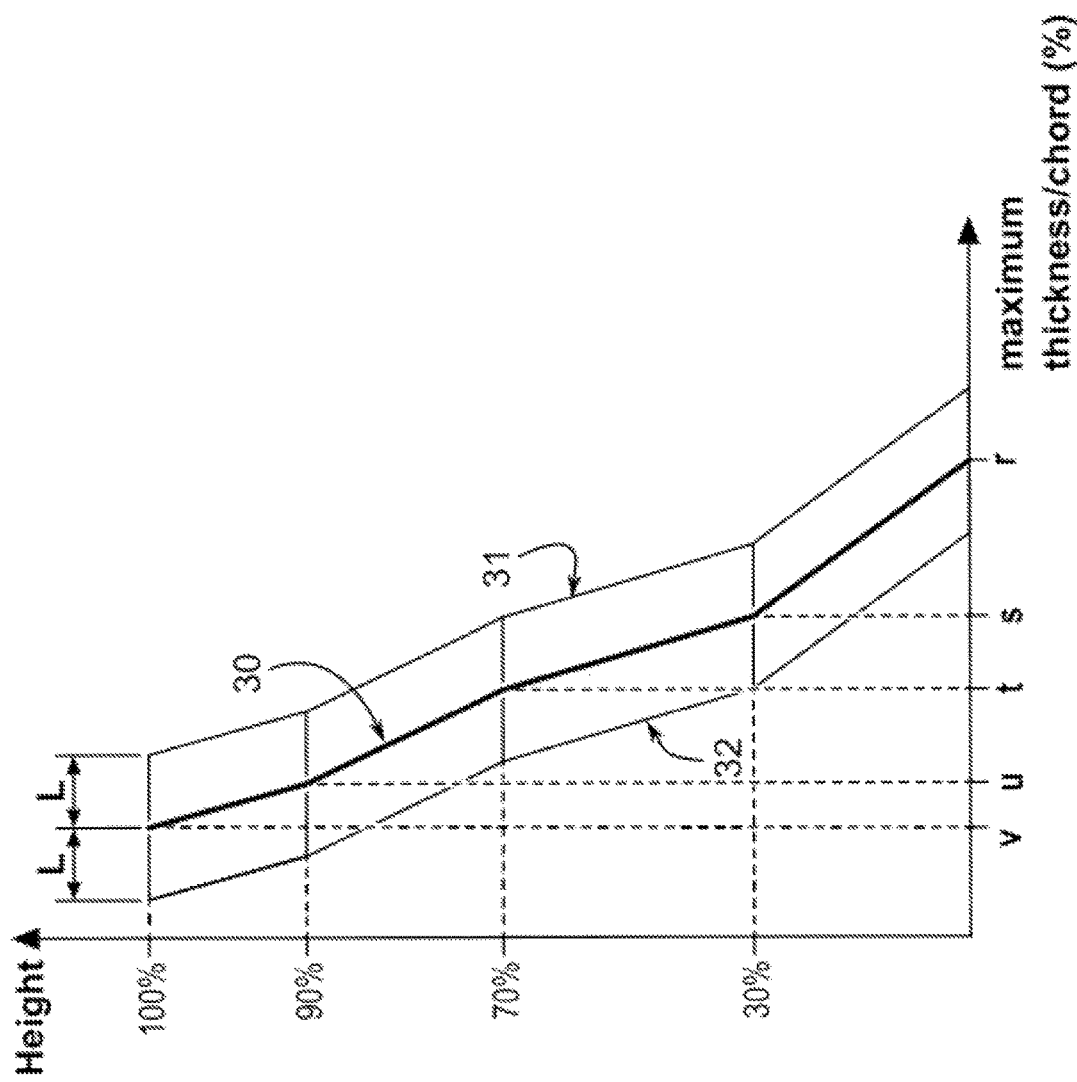
FIG. 5 is a diagram illustrating the evolution, between the root and the tip of the blade, of the ratio of the maximum thickness to the blade chord according to the invention.

A maximum thickness law in this sense is illustrated in the graph of FIG. 5, in which the value of the ratio between the maximum thickness and the chord is shown as the abscissa, while the height of the blade section is shown as the ordinate.

In FIG. 5, the maximum thickness law of the blade is shown by the curve 30 in a bold continuous line on this graph.

The curve 30 corresponds to variations of the ratio between the maximum thickness and the chord which follow a piecewise affine function:
- of the ratio between the maximum thickness and the chord r at height percentage 0% to the ratio between the maximum thickness and the chord s at height percentage 30%,
- of the ratio between the maximum thickness and the chord s at height percentage 30% to the ratio between the maximum thickness and the chord t at height percentage 70%,
- of the ratio between the maximum thickness and the chord t at height percentage 70% to the ratio between the maximum thickness and the chord u at height percentage 90%,
- of the ratio between the maximum thickness and the chord u at height percentage 90% to the ratio between the maximum thickness and the chord at height percentage 100%.

A piecewise affine function is a function formed by line sections or portions of straight lines.

In FIG. 5, the five values r, s, t, u, and v of the ratio between the maximum thickness and the chord have been placed on the axis of the abscissa and, in correspondence with these ratios, the associated different height percentages are placed on the axis of the ordinates.

Other maximum thickness laws of the blade depending on its height can be defined based on the maximum thickness law of the blade depending on its height as it was just defined.

In particular, the value L of the ratio between the maximum thickness and the chord can be added to or subtracted from the values of the ratio between the maximum thickness and the chord of the maximum thickness law of the blade depending on its height, as it was just defined.

This defines two limit curves 31 and 32 shown in FIG. 5, which are two piecewise affine curves (curves formed from portions of straight lines).

The curves 31 and 32 define a corridor with half-width L around the maximum thickness law of the blade depending on its height as it was just defined.

The corridor is shown in the form of a hashed zone in FIG. 5.

The following values allow defining more precisely the maximum thickness laws:
- r can be comprised between 8% and 18% preferably on the order of 13%;
- s can be comprised between 1% and 7% preferably on the order of 4%;
- t can be comprised between 0.5% and 4.5% preferably on the order of 2.5%;
- u can be comprised between 0.5% and 5% preferably on the order of 2.5%;
- v can be comprised between 0.1% and 0.9% preferably on the order of 1.5%;
- L can be comprised between 0.1% et 1.9% preferably on the order of 1%.

Any graph which is inscribed in the corridor separating the curves 31 and 32 in FIG. 5 can define a maximum thickness law of the blade depending on its height, taking into account the preceding features.

In particular L=1% can be selected to define a maximum thickness law of the blade depending on its height. A law of this type corresponds to a graph comprised between:
- a first function defined by
    - a first piece of a line defined by a ratio between the maximum thickness and the chord at the blade root equal to 12% and a ratio between the maximum thickness and the blade chord at 30% of the height of the blade equal to 3%,
    - a second piece of a line defined by a ratio between the maximum thickness and the chord at 30% of the height of the blade equal to 3% and a ratio between the maximum thickness and the chord at 70% of the height of the blade equal to 1.5%,
    - a third piece of a line defined by a ratio between the maximum thickness and the chord at 70% of the height of the blade equal to 1.5% and a ratio between the maximum thickness and the chord at 90% of the height of the blade equal to 1.5%,
    - a fourth piece of a line defined by a ratio between the maximum thickness and the chord at 90% of the height of the blade equal to 1.5% and a ratio between the maximum thickness and the chord at the blade tip equal to 0.5%, and
- a second function defined by
    - a fifth piece of a line defined by a ratio between the maximum thickness and the chord at the blade root equal to 14%, and a ratio between the maximum thickness and the chord at 30% of the height of the blade equal to 5%,
    - a sixth piece of a line defined by a ratio between the maximum thickness and the chord at 30% of the height of the blade equal to 5%, and a ratio between the maximum thickness and the chord at 70% of the height of the blade equal to 3.5%,
    - a seventh piece of a line defined by a ratio between the maximum thickness and the chord at 70% of the height of the blade equal to 3.5%, and a ratio between the maximum thickness and the chord at 90% of the height of the blade equal to 3.5%, and
    - an eighth piece of a line defined by a ratio between the maximum thickness and the chord at 90% of the height of the blade equal to 3.5%, and a ratio between the maximum thickness and the chord at the blade tip equal to 2.5%.

More precisely, the graph corresponding to the maximum thickness law and comprised between the two graphic representations of the functions as they were just defined can vary along a piecewise affine function. The graph can also correspond to a ratio between the maximum thickness and the chord of a blade section which decreases and/or remains constant as the height of the section increases.

Operating Line of a Turbomachine Fan

Figure 6:
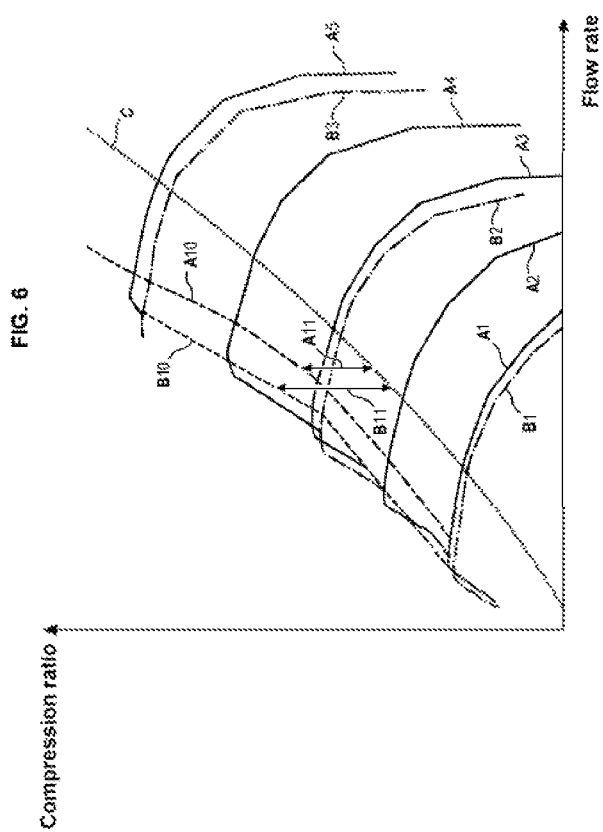
FIG. 6 shows schematically the operating lines of a fan conforming to one embodiment of the invention, and of a fan according to the prior art.

With reference to FIG. 6, the operating lines of a fan represent schematically the compression ratio as a function of flow rate.

The curves A1, A2, A3, A4 and A5 correspond to five engine speeds, i.e. five rotation speeds of the engine, involving blades and a fan of the prior art. At a given speed, flight conditions impose a position on the curve or an operating point of the engine, i.e. a pair of values of a flow rate and a compression ratio. Ideally, the operating point of the engine is located near the curve C, which is the nominal operating curve.

Curve A10 embodies the border of the flutter zone according to the same prior art. The operating points of the engine located on the curves A1, A2, A3, A4 or A5 and to the left of curve A10 correspond to a large flutter phenomenon.

The flutter margin can be defined as a distance A11 between curve C and curve A10.

Curve B10 embodies the border of the flutter zone of the corresponding engine. The flutter margin can be defined as a distance B11 between curve B10 and curve C, the nominal operating curve.

The distance B11 being greater than the distance A11, the flutter margin has been increased relative to the prior one.

Numerical simulations show that satisfying a maximum thickness law:
  reduces the value of bending-torsion coupling
  increases the value of the frequency of the first bending mode of the blade.

The reduction of the bending-torsion coupling and the increase of the frequency of the first bending mode tend to reduce the effect of flutter and increase the flutter margin.

One advantage contributed by the invention is the increase of the flutter margin without degrading the mechanical behavior of the blade or the aerodynamic performance of the blade.

The invention claimed is:

1. A turbomachine rotor blade comprising
a plurality of sections stacked along an axis Z between a blade root and a blade tip, each section including:
  a leading edge,
  a trailing edge,
  a pressure side, and
  a suction side,
  each section having:
    a height extending from 0% corresponding to the blade root and 100% corresponding to the blade tip,
    a chord defined by a length of a portion of a line connecting the leading edge and the trailing edge,
    a maximum thickness defined by a maximum distance between the suction side and the pressure side, and
    a ratio of the maximum thickness to the chord for each of the plurality of sections,
  wherein:
    the ratio of a section at 30% of the height of the blade is between 20% and 42% of the ratio of a section at the blade root,
    the ratio of a section at 70% of the height of the blade is between 10% and 30% of the ratio of the section at the blade root,
    the ratio of a section at 90% of the height of the blade is between 10% and 30% of the ratio of the section at the blade root, and
    the ratio of a section at the blade tip is comprised between 3% and 21% of the ratio of the section at the blade root,
    wherein the ratio of each section depending on the height of the section is defined by a curve comprising a plurality of linear segments, the ratio defined by the plurality of linear segments decreasing as the height of a given section increases or remaining constant as the height of a given section increases, and
    wherein the plurality of line segments of the curve comprises a first line segment extending from the blade to root of 30% of the height of the blade, a second line segment extending from 30% to 70% of the height of the blade, a third line segment extending from 70% to 90% of the height of the blade, and a fourth line segment extending from 90% of the height of the blade to the blade tip.

2. The turbomachine rotor blade according to claim 1, wherein
the ratio of each section depending on the height of the section is further defined by:
  a first curve comprising a plurality of line segments, wherein:
    a first line segment defined by a minimum ratio of the section at the blade root equal to 12% and a minimum ratio of the section at 30% of the height of the blade equal to 3%,
    a second line segment defined by the minimum ratio of the section at 30% of the height of the blade and a minimum ratio of the section at 70% of the height of the blade equal to 1.5%,
    a third line segment defined by the minimum ratio of the section at 70% of the height of the blade and a minimum ratio of the section at 90% of the height of the blade equal to 1.5%, and
    a fourth line segment defined by the minimum ratio of the section at 90% of the height of the blade, and a minimum ratio of the section at the blade tip equal to 0.5%, and
  a second curve comprising a plurality of line segments, wherein:
    a fifth line segment defined by a maximum ratio of the section at the blade root equal to 14%, and a maximum ratio of the section at 30% of the height of the blade equal to 5%,
    a sixth line segment defined by the maximum ratio of the section at 30% of the height of the blade, and a maximum ratio of the section at 70% of the height of the blade equal to 3.5%,
    a seventh line segment defined by the maximum ratio of the section at 70% of the height of the blade, and a maximum ratio of the section at 90% of the height of the blade equal to 3.5%, and
    an eighth line segment defined by the maximum ratio of the section at 90% of the height of the blade, and a maximum ratio of the section at the blade tip equal to 2.5%.

3. The turbomachine rotor blade according to claim 1, wherein the ratio of the section at 30% of the height of the blade is between 26% and 36% of the ratio of the section at the blade root.

4. The turbomachine rotor blade according to claim 1, wherein the ratio of the section at 70% of the height of the blade is between 14% and 24% of the ratio of the section at the blade root.

5. The turbomachine rotor blade according to claim 1, wherein the ratio of the section at 90% of the height of the blade is between 14% and 24% of the ratio of the section at the blade root.

6. The turbomachine rotor blade according to claim 1, wherein the ratio of the section at the blade tip is between 6.5% and 16.5% of the ratio of the section at the blade root.

7. The turbomachine rotor blade according to claim 1, wherein the ratio of the section at the blade root is between 8% and 18%.

8. A turbomachine fan including a plurality of turbomachine rotor blades according to claim 1 radially extending from a rotor and arranged about an axis of rotation of the rotor.

9. A turbomachine comprising the turbomachine fan according to claim 8.

* * * * *